(12) United States Patent
Weinert et al.

(10) Patent No.: US 10,873,583 B2
(45) Date of Patent: Dec. 22, 2020

(54) EXTENSIBLE FRAMEWORK FOR AUTHENTICATION

(71) Applicant: Microsoft Technology Licensing, LLC, Redmond, WA (US)

(72) Inventors: Alexander T. Weinert, Seattle, WA (US); Caleb G. Baker, Seattle, WA (US); Pui-Yin Winfred Wong, Redmond, WA (US); Carlos Adrian Lopez Castro, Duvall, WA (US); Yordan I. Rouskov, Seattle, WA (US); Laurentiu B. Cristofor, Redmond, WA (US); Michael V. McLaughlin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 142 days.

(21) Appl. No.: 15/866,130

(22) Filed: Jan. 9, 2018

(65) Prior Publication Data
US 2019/0089710 A1    Mar. 21, 2019

Related U.S. Application Data

(60) Provisional application No. 62/561,108, filed on Sep. 20, 2017.

(51) Int. Cl.
*H04L 29/06* (2006.01)
*G06F 21/31* (2013.01)
(Continued)

(52) U.S. Cl.
CPC ............ *H04L 63/102* (2013.01); *G06F 21/31* (2013.01); *G06F 21/32* (2013.01); *G06F 21/34* (2013.01);
(Continued)

(58) Field of Classification Search
CPC .. H04W 12/06; H04W 12/08; H04L 63/0807; H04L 9/3213; H04L 63/102; H04L 63/08;
(Continued)

(56) References Cited

U.S. PATENT DOCUMENTS 6,035,402 A    3/2000  Vaeth et al.
8,726,358 B2 *  5/2014  Rouskov ............. H04L 63/0807
                                            707/784
(Continued)

FOREIGN PATENT DOCUMENTS

WO    2014160853 A1    10/2014
WO    2016196849 A1    12/2016

OTHER PUBLICATIONS

Sakimura, et al., "OpenID Connect Discovery 1.0 incorporating errata set 1", Retrieved From <<http://openid.net/specs/openid-connect-discovery-1_0.html#ProviderMetadata>>, Nov. 8, 2014, 22 Pages.
(Continued)

*Primary Examiner* — Alexander Lagor
*Assistant Examiner* — Howard H. Louie
(74) *Attorney, Agent, or Firm* — Fiala & Weaver P.L.L.C.

(57) ABSTRACT

Methods, systems, and apparatuses in a computing device enable user access to a resource. The method includes receiving, from a user, a request for access to a resource; accessing an authentication flow for granting access to the resource; obtaining first claims for a user from a first claims provider in the authentication flow; determining a second claims provider in the authentication flow, the second claims provider having a trust relationship with the claims facilitator; directing the user to the second claims provider; receiving second claims for the user from the second claims provider; and enabling the user to access the resource in response to at least the received first and second claims.

20 Claims, 10 Drawing Sheets

(51) Int. Cl.
*H04L 9/32* (2006.01)
*G06F 21/40* (2013.01)
*G06F 21/32* (2013.01)
*G06F 21/34* (2013.01)

(52) U.S. Cl.
CPC ............ *G06F 21/40* (2013.01); *H04L 9/3226* (2013.01); *H04L 9/3231* (2013.01); *H04L 63/08* (2013.01); *H04L 2463/082* (2013.01)

(58) Field of Classification Search
CPC . H04L 2463/082; H04L 9/3231; H04L 29/06; H04L 9/32; H04L 9/3226; G06F 21/31; G06F 21/40; G06F 21/32; G06F 21/34
See application file for complete search history.

(56) References Cited

U.S. PATENT DOCUMENTS

| | | | | |
|---|---|---|---|---|
| 9,026,623 | B2* | 5/2015 | Wang | H04L 41/0803 705/14.23 |
| 9,165,291 | B1* | 10/2015 | Andersen | G06Q 20/10 |
| 2007/0118886 | A1* | 5/2007 | Martin | H04L 63/0435 726/5 |
| 2008/0010665 | A1 | 1/2008 | Hinton et al. | |
| 2008/0313730 | A1 | 12/2008 | Iftimie et al. | |
| 2014/0282989 | A1* | 9/2014 | Young | H04L 63/08 726/9 |
| 2015/0121500 | A1* | 4/2015 | Venkatanaranappa | H04L 63/0815 726/8 |
| 2016/0094733 | A1* | 3/2016 | Saito | H04N 1/00244 358/1.15 |
| 2016/0219027 | A1* | 7/2016 | Kaplan | H04L 63/08 |
| 2018/0075231 | A1 | 3/2018 | Subramanian et al. | |
| 2019/0149531 | A1 | 5/2019 | Kakumani et al. | |
| 2019/0149579 | A1 | 5/2019 | Kakumani et al. | |

OTHER PUBLICATIONS

Jones, et al., "JSON Web Signature (JWS)", Retrieved From <<https://tools.ietf.org/html/rfc7515#section-4.1.4>>, May 2015, 59 Pages.

"OAuth 2.0", Retrieved From <<http://oauth.net/2/>>, Retrieved on: Aug. 21, 2017, 3 Pages.

"Build Smarter Productivity Apps", Retrieved From <<https://developer.microsoft.com/en-us/graph/>>, Retrieved on: Aug. 21, 2017, 8 Pages.

Menezes, et al., "Chapter 10 Identification and Entity Authentication", In Publication of CRC press, Oct. 1, 1996, pp. 385-424.

"International Search Report and Written Opinion Issued in PCT Application No. PCT/US2018/039628", dated Oct. 4, 2018, 12 Pages.

"Non-Final Office Action Issued in U.S. Appl. No. 15/809,621", dated Aug. 19, 2019, 13 Pages.

"Non Final Office Action Issued in U.S. Appl. No. 15/809,651", dated Aug. 21, 2019, 6 Pages.

"Final Office Action Issued in U.S. Appl. No. 15/809,621", dated Feb. 20, 2020, 17 Pages.

\* cited by examiner

500

Perform a procedure in the first claims provider located in the computing device of the claims facilitator to generate the first claims — 502

Determine the first claims provider in the authentication flow, the first claims provider external to the computing device and having a trust relationship with the claims facilitator — 602

Direct the user to the first claims provider — 604

Receive the first claims from the first claims provider — 606

702 — Determine at least one additional claims provider in the authentication flow, the at least one additional claims provider having a trust relationship with the claims facilitator 704 — Direct the user to the at least one additional claims provider 706 — Receive from the at least one additional claims provider additional claims corresponding to the at least one additional claims providers

802 — Enable the user to access the resource in response to the first claims, the second claims, and the additional claims corresponding to the at least one additional claims providers

902 — Prior to receiving the request for access to the resource, establish a trust relationship with at least the second claims provider

```
Store for the second claims provider: an identifier for the second claims
   provider, an address for accessing the second claims provider,
one or more controls that enable one or more claims to be requested from the
  second claims provider, and expected values for the one or more claims
```
— 1002

```
First compare the generated first claims to stored expected values for the
                            first claims
```
— 1102

```
Second compare the received second claims to the stored expected values
                          for the second claims
```
— 1104

```
Determine whether to enable the user access to the resource based on results
                of the first compare and the second compare
```
— 1106

```
Enable a customer administrator to define the authentication flow
```
— 1202

FIG. 12

EXTENSIBLE FRAMEWORK FOR AUTHENTICATION

CROSS-REFERENCE TO RELATED APPLICATIONS

This application claims priority to U.S. Provisional Patent Application No. 62/561,108, filed Sep. 20, 2017 and entitled "Extensible Framework for Authentication," the entirety of which is incorporated by reference herein.

BACKGROUND

Multi-factor authentication (MFA) is a technique of computer access control in which a user is granted access to a resource only after successfully completing multiple authentication procedures using corresponding authentication mechanisms. Authentication mechanisms for a user are typically based on factors such as information known by the user (knowledge), something the user possesses (possession), and something the user is (inherence).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for enabling access to a resource using multiple authentication procedures in an extensible manner. A claims facilitator includes an authentication flow manager configured to receive, from a user, a request for access to a resource, access an authentication flow for granting access to the resource, and obtain first claims for the user from a first claims provider in the authentication flow. The authentication flow manager is further configured to determine a second claims provider in the authentication flow. The second claims provider has a trust relationship with the claims facilitator. The authentication flow manager is further configured to direct the user to the second claims provider, and receive second claims for the user from the second claims provider. The claims facilitator further includes a resource access controller configured to enable the user to access the resource in response to at least the first and second claims.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 5 shows a flowchart for obtaining first claims from a first provider, according to an example embodiment.

FIG. 6 shows another flowchart for obtaining first claims from a first provider, according to an example embodiment.

FIG. 7 shows a flowchart for obtaining additional claims from an additional claims provider, according to an example embodiment.

FIG. 8 shows a flowchart for enabling access to a resource based on multiple successful authentications, according to an example embodiment.

FIG. 9 shows a flowchart for establishing trust relationships, according to an example embodiment.

FIG. 10 shows another flowchart for configuring a trusted claims provider, according to an example embodiment.

FIG. 11 shows another flowchart for enabling access to a resource based on multiple successful authentications, according to an example embodiment.

FIG. 12 shows a flowchart for enabling the defining of the authentication flow, according to an example embodiment.

Figure 1:
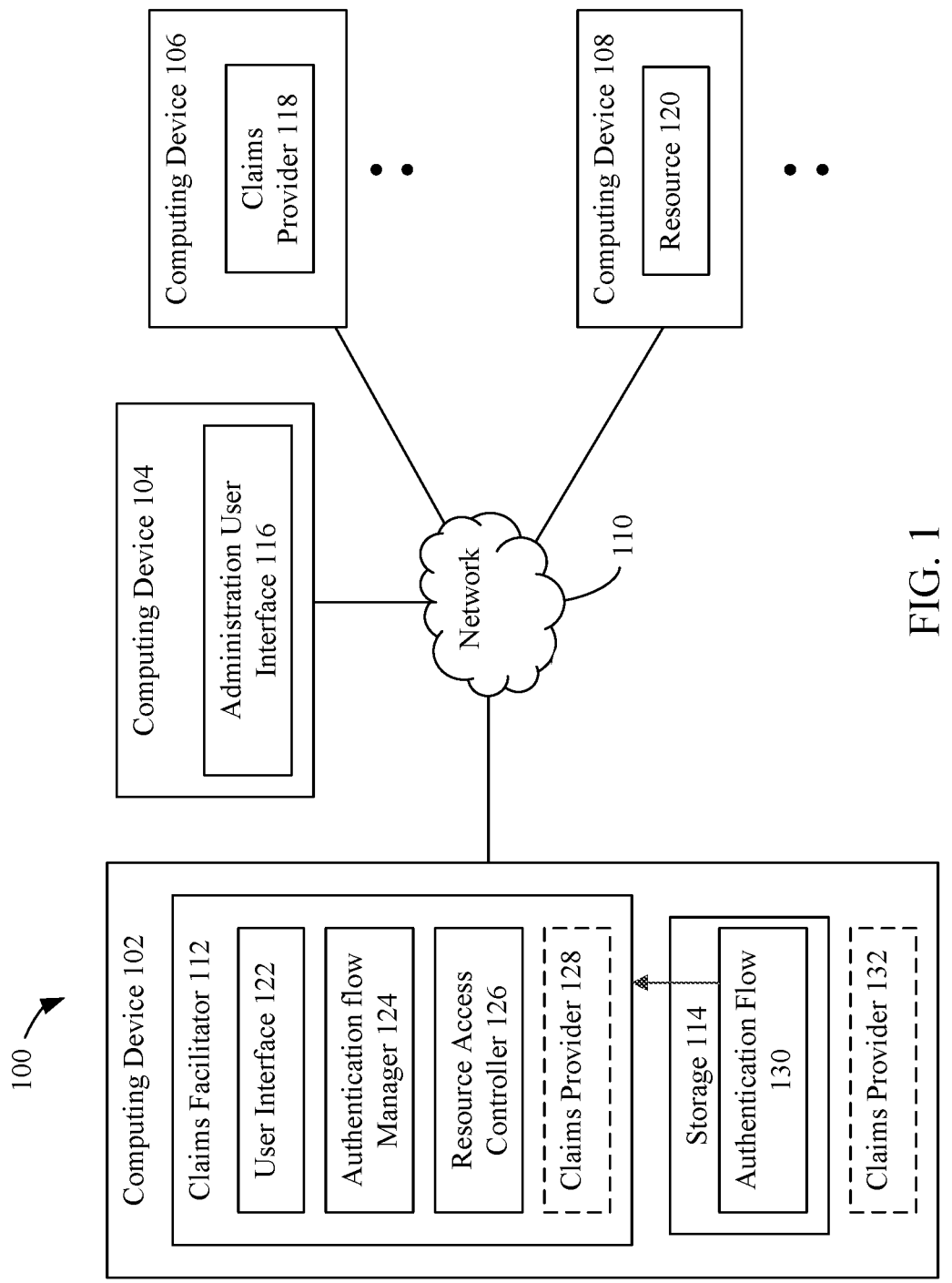
FIG. 1 shows a block diagram of a system for enabling access to a resource via multiple authentication procedures in an extensible manner, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

User authentication techniques (e.g., a user name and corresponding password) are used by a machine or network to ensure that when a user account is trying to access a resource (e.g., information, a website, a program, etc.) that the user using that user account is the valid, correct user of the account and is allowed to gain access to the resource prior to enabling the user access to the resource, while denying access to unauthorized users. However, if the resource that is being accessed is highly sensitive, or the user account has a high risk of being hacked (e.g., as determined by a system administrator), the user account may need to be authenticated using multiple authentication procedures before gaining access to the resource. This is referred to as authenticating a user using multi-factor authentication ("MFA"). For example, a user may need to not only enter a user name and corresponding password, but the user may also be required to pass back a code that was texted to the user's previously confirmed cell phone number, provide a fingerprint as a second technique of authentication, or provide another secondary, tertiary, or further authentication measure as additional authentications. However, current MFA techniques occur within a single server, restricting the number and types of authentication techniques that can be used to authenticate a user to those native to the server. If an authentication technique is not present within the single server, then the user cannot be authenticated using that technique.

Embodiments overcome these and other issues related to MFA. In embodiments, a user is enabled or prevented access to a resource based on one or more controls. Such controls include authentication procedures/techniques of any type, including entered codes, biometric analysis, and/or any other type of authentication procedure, including a compliance procedure, such as viewing and accepting a 'Terms of Use' agreement. Furthermore, the controls may be performed at one or more internal (same machine) or external (at a different machine) claims providers via a common central server or platform (i.e., a common server, authentication provider, or directory (e.g., Azure Active Directory)), as defined by an authentication flow, in a novel fashion.

In an embodiment, an extensible MFA system includes a computing device that acts as the central platform and includes a claims facilitator configured to enable or prevent user access to a resource. When the claims facilitator receives a user request for access to a resource, the claims facilitator obtains a stored authentication flow based on the user and/or resource. The stored authentication flow enables extensibility by enabling an order of controls (e.g., gates) to be defined that need to be completed by the user at corresponding claims providers in order for the user to gain access to the resource. The stored authentication flow is not static and may be developed and modified by an administrator. Upon obtaining the stored authentication flow, and following the order as defined in the authentication flow, the claims facilitator directs the user to each claims provider such that the user is prompted to complete the required procedure at the claims provider as defined by the control. Upon each user completion of a required procedure, the claims facilitator receives a set of claims associated with the user's performance from the claims provider. The claims facilitator compares each of the received set of claims to stored expected values for the set of claims (i.e., success criterion) to determine if the success criterion is met and ultimately, whether the user is enabled or prevented access to the resource.

In general, a claims provider is a service, application, device, and/or other entity that may be accessed for authenticating the identity of a user. In response to a request, a claims provider generates a set of one or more claims based on a user indicated in the request. The user may be indicated in the request in the form of a user identifier (e.g., login name, account name, etc.), and optionally user provided information, such as a code, user profile/personal information (e.g., a birthdate, a social security number, an answer to a predetermined question such as "a favorite pet name," "a school mascot name," etc.), a biometric measurement (e.g., a fingerprint, a retina scan, etc.), and/or other user-provided information. A claim is a statement by the claim provider that can have a value of any form. The claims may be included in a token (e.g., a security token) or have another form for transport. The token may have the form of XML (extensible markup language) or other format records, that may include an identification of the user, the set of claims, a lifetime of the token, an identifier for the claims provider, etc. The claims provider transmits the set of claims (e.g., the token) back to the requestor. The values of the claims in the set may be compared to a set of expected claim values, and if a match occurs, the user's identity is authenticated by the claims provider. If a match does not occur, the user's identity is not authenticated by the claims provider.

In embodiments, if the received set of claims matches or contains the stored set of claims, the claims facilitator determines that the success criterion is met. Alternatively, if the received set of claims does not match, including containing fewer than the expected number of claims, the claims facilitator determines that the success criterion is not met, and access to the resource is denied the user. When the claims success criterion is met, the corresponding control in the authentication flow is satisfied (e.g., the gate is opened). Alternatively, if a success criterion is not met, the corresponding control in the authentication flow is not satisfied (e.g., one or more of the gate remain closed). In order for the user to obtain access to the resource, the claims facilitator must determine that success criterion is achieved for each received set of claims (e.g., each gate is opened). In other words, the claims facilitator acts as the gatekeeper for the authentication flow to grant access to a given resource with controls input from one or more claims providers.

In embodiments, each claims provider in an authentication flow may be internal or external to the claims facilitator. If a claims provider is internal to the claims facilitator, the stored values are known (e.g., stored) in the claims facilitator. If a claims provider is external to the claims facilitator, a trust relationship is must be established between the claims facilitator and the claims provider, such that the stored values for desired claims are transmitted to the claims facilitator by the claims provider at or after the time the trust relationship is established. In accordance with such an implementation, an administrator first performs a set-up process for the trust relationship with each external claims provider.

In one example of such a set-up/registration process for a claims provider, a tenant is created and an application is created by the claims facilitator for the external claims provider. The application is set to be multi-tenanted and the external claim provider's URL (uniform resource locator) or other address is stored with the application such that when the external claims provider is invoked, the user is redirected to the address to complete the required procedure. Several properties may be used for accessing the claims provider such as an object ID, an application ID, a home page URL, and a reply URL. These example properties are described in further detail elsewhere herein. Furthermore, information is stored for the external claims provider to define an entry for the claim provider's policy, such as provider name, AppID, ClientID, DiscoveryUrl, and Controls. "Controls" is a list of claims, each of which includes a descriptive name and ClaimsRequested (a list of claim entities to fulfill the control). This information is described in further detail elsewhere herein. When accessed in this manner, the external claims provider generates a response to be provided to the tenant such that authentication is provided for that claims provider. The claims facilitator stores the information for the external claims provider including the URL to redirect the user to, an identifier to verify that the external claims identifier is in fact the external claims provider, and a set of claims that confirm a success criterion for the external claims provider. This information is described in further detail elsewhere herein.

In embodiments, and as described above, the administrator may define the authentication flow. Once an internal or external claims provider is added to the tenant, the tenant can use this claims provider and access controls provided by the external claims provider. In other words, the administrator can add any control from any trusted claims provider to an authentication flow, even external claims providers. For instance, if an administrator wants to use a retinal scanner as a control but the central platform does not enable retinal scanning, the administrator can add a trusted, external retinal scanning provider to the authentication flow.

In an embodiment, the trust relationship defines both a secure, verifiable (e.g., via a public-private key) relationship and success criterion (i.e., expected set of claims) for authentication. Thus, when it is time for the user to complete the required control at the external claims provider as part of the authentication flow, the user is redirected to that external claims provider. The user performs the required procedure defined by the control at the external claims provider and then is redirected back to the claims facilitator with a token including the set of claims (or other indication of authentication procedure completion). The claims facilitator compares the token to the stored expected values defined by the trust relationship to verify that the information came from the external claims provider and to determine if the success criterion was met, as noted above. In other words, embodiments provide the ability to chain together an arbitrary number of controls from an arbitrary number of claims providers into a single authentication flow.

This approach has numerous advantages, including completing a single authentication flow without using federation (i.e., the inter-operation of different distinct telecommunication networks.) Furthermore, a system administrator (or other user) may configure the order of controls and corresponding claims providers that a particular user needs to be authenticated by to obtain access to a particular resource and may use any number of internal and/or external claims providers. By first establishing a trust relationship between the claims facilitator and a claims provider, both a secure (e.g., using public-private key encryption for communications) relationship and success criterion for authentication are defined. In this manner, the authentication flow to is easily configurable and extendable by the administrator.

Example embodiments are described as follows that are directed to techniques for enabling access to a resource in an extensible manner. For instance, FIG. 1 shows a block diagram of a system 100 for enabling access to a resource via multiple authentication procedures in an extensible manner, according to an example embodiment. As shown in FIG. 1, system 100 includes a computing device 102, a computing device 104, a computing device 106, and a computing device 108 which are all communicatively coupled via network 110. Network 110 may comprise one or more networks such as local area networks (LANs), wide area networks (WANs), enterprise networks, the Internet, etc., and may include one or more of wired and/or wireless communication links. Computing device 102 includes a claims facilitator 112 and storage 114. Claims facilitator 112 includes a user interface 122, an authentication flow manager 124, a resource access controller 126, an optional claims provider 128, and an optional claims provider 132. These and further features of FIG. 1 are described as follows.

Computing devices 102, 104, 106, and 108 may each be any type of stationary or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), or a stationary computing device such as a desktop computer or PC (personal computer). Computing device 106 and computing device 108 may each be web server or a collection of servers that are accessible over network 110 (e.g., "network-based" or "cloud-based" servers in an embodiment) to store, manage, and process data. Although computing devices 102, 104, 106, and 108 are shown in FIG. 1, in other embodiments, other numbers of computing devices 102, 104, 106, and 108 may be present in system 100, including tens, hundreds, thousands, and greater numbers.

Computing device 102 includes storage that stores one or more authentication flows for users to obtain access to resources. For instance, and as shown in FIG. 1, computing device 102 includes storage 114. Storage 114 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium. Storage 114 may store authentication flow 130 and optionally further information. Authentication flow 130 may be defined by a user at computing device 102, or by other entity at computing device 102 or elsewhere.

For example, in an embodiment, computing device 104 (or computing device 102) may include an administration user interface (UI) 116. A user such as a customer, system administrator, or other user may define authentication flow 130 by interacting with administrator UI 116. In embodiments, the user defines authentication flow 130 to include an order of authentications for a user to obtain access to a resource. For instance, the user may interact with one or more UI elements (e.g., buttons, menus, check boxes, text boxes, navigators, a browser, etc.) of administration UI 116 to select the particular authentication procedures to include in authentication flow 130, and set their order. Each authentication procedure may designate a particular claims provider and claims that enable authentication. A claims provider may be located in computing device 102, such as claims provider 132 which is local to claims facilitator 112, may be located internal to claims facilitator 112, such as claims provider 128, or may be located external to computing device 102, such as computing device 106 located in computing device 106 (accessible over network 110).

Computing device 102 includes claims facilitator 112, which is configured to enable access to resources, thereby making computing device 102 the central server or platform for extensible MFA. In embodiments, claims facilitator 112 is configured to obtain and manage the authentication flows for users, receive user requests for access to resources, access claims providers corresponding to an authentication flow for a requested resource, receive returned information from claims providers in the authentication flow, and enable or prevent access to the resources.

Computing device 108 includes one or more resources to which a user may request access. For instance, as shown in FIG. 1, computing device 108 includes resource 120, and may include any number of further resources. Resource 120 may be any type and configuration of resource, such as an application, a computing device, a document, a video file, an audio file, a web page, any combination thereof, etc.

Claims facilitator 112 is configured to receive a user request for access to resource 120. For instance, as shown in FIG. 1, claims facilitator 112 includes user interface 122 with which a user may interact. User interface 122 is configured to receive a user request for access to resource 120 via one or more UI elements (e.g., buttons, menus, check boxes, text boxes, navigators, a browser, etc.).

As noted above, claims facilitator 112 is further configured to obtain and manage authentication flow 130. As shown in FIG. 1, claims facilitator 112 includes authentication flow manager 124. In response to receiving the user request via user interface 122 (or other interface), authentication flow manager 124 is configured to obtain the authentication flow from storage 114 that corresponds to the resource and user, which may be authentication flow 130. Authentication flow manager 124 executes authentication flow 130 to enable the user to attempt to access the resource. In embodiments, authentication flow manager 124 is configured to direct the user to each claims provider indicated in authentication flow 130, such that the user may complete each associated authentication procedure. Upon completion of each procedure, resource access controller 126 is configured to receive the sets of claims associated with the authentication procedures and determine if success criterion is met. Resource access controller 126 is configured to determine, based on the success criterion of each of the obtained claims, whether the user is to be granted access to resource 120 or be prevented access to resource 120.

As mentioned, each claims provider included in authentication flow 130 may be internal or external to claims facilitator 112. For instance, claims facilitator 112 may include optional claims provider 128 internal to claims facilitator 112. If claims provider 128 is included in authentication flow 130, authentication flow manager 124 communicates with claims provider 128 to enable the user to complete an authentication procedure. Once the user completes the procedure, claims provider 128 generates a set of claims based on the completed procedure and transmits the set of claims to resource access controller 126. As shown in FIG. 1, computing device 106 includes a claims provider 118 that is external to claims facilitator 112. If claims provider 118 is included in authentication flow 130, authentication flow manager 124 directs the user to claims provider 118 to complete a procedure at computing device 106 over network 110. Once the user completes the procedure of claims provider 118, claims provider 118 generates a set of claims based on the user performance. The user is redirected back to computing device 102 and resource access controller receives a token (including the generated set of claims) from claims provider 118.

Any number of two or more claims providers of claims facilitator 112, computing device 102, computing device 106, and/or further computing devices may be included in authentication flow 130 for performing corresponding authentication procedures. After resource access controller 126 receives a set of claims corresponding to each authentication procedure in authentication flow 130, resource access controller 126 compares each set of claims to corresponding stored claims, and determines based on the comparisons whether the user is to be given access to, or prevented access to resource 120.

Accordingly, in embodiments, when the user requests access to resource 120, claims facilitator 112 performs a MFA process that is configurable and extensible via authentication flow 130, and either enables or prevents the user access to resource 120. Claims facilitator 112 may perform such a MFA process in various ways.

Figure 2:
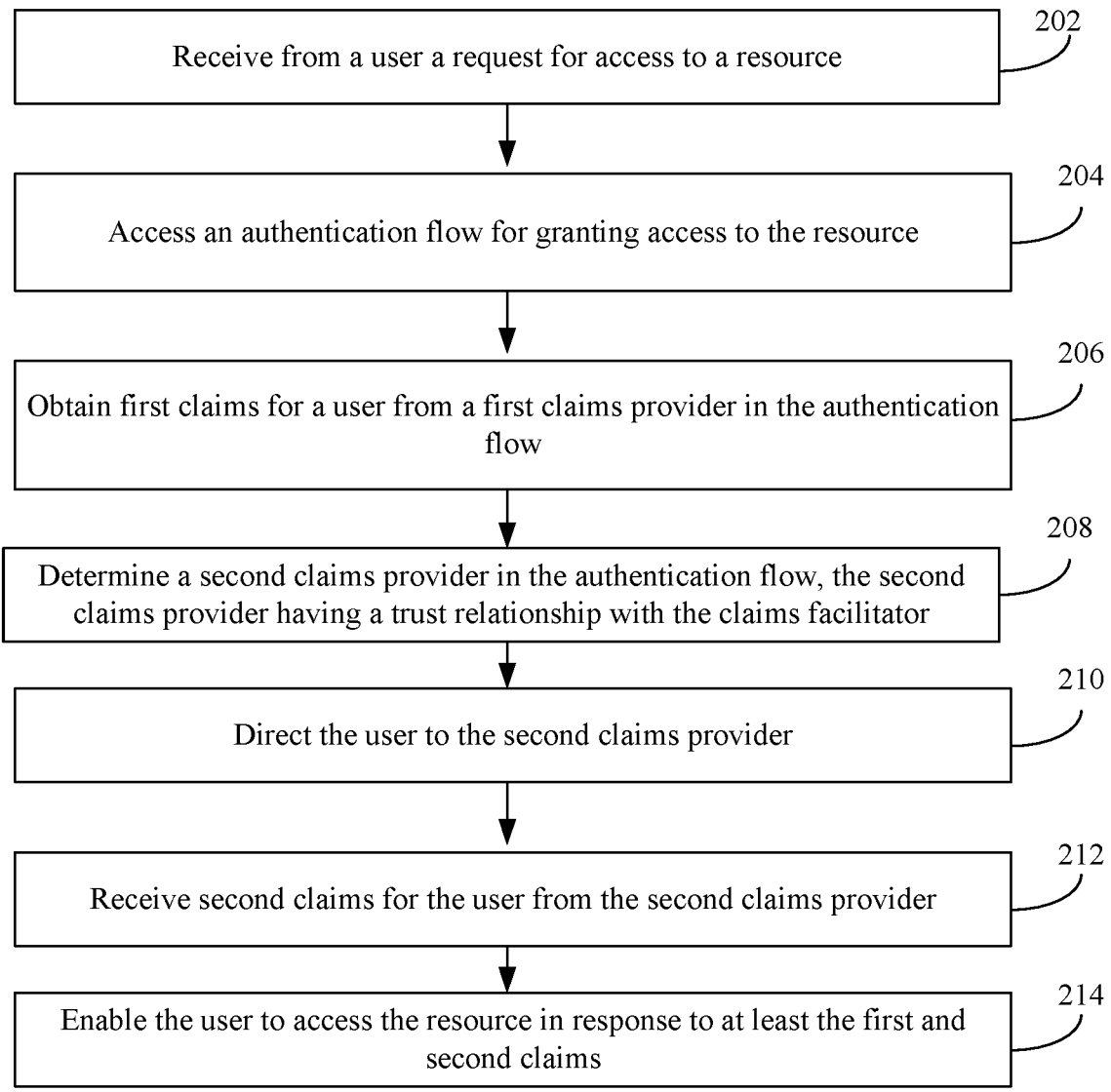
FIG. 2 shows a flowchart for enabling access to a resource via multiple authentication procedures in an extensible manner, according to an example embodiment.

For instance, FIG. 2 shows a flowchart 200 for enabling access to a resource via multiple authentication procedures in an extensible manner, according to an example embodiment. In an embodiment, flowchart 200 may be implemented by claims facilitator 112. FIG. 2 is described with continued reference to FIG. 1. Other structural and operational embodiments will be apparent to persons skilled in the relevant art(s) based on the following discussion regarding flowchart 200 and system 100 of FIG. 1.

Flowchart 200 begins with step 202. In step 202, a request for access to a resource is received from a user. For example, with reference to FIG. 1, claims facilitator 112 receives a request for access to resource 120 from a user via user interface 122.

In step 204, an authentication flow for granting access to the resource is accessed. For instance, with reference to FIG. 1, authentication flow manager 124 of claims facilitator 112 accesses authentication flow 130 from storage 114. Authentication flow 130 includes multiple authentication procedures in a defined order for the user to be granted access to resource 120.

In step 206, first claims for a user are obtained from a first claims provider in the authentication flow. For instance, with reference to FIG. 1, resource access controller 126 obtains first claims from a first claims provider identified in authentication flow 130. As noted above and as described in detail hereinafter, each claims provider in authentication flow 130 may be either internal or external to claims facilitator 112. As such, the first claims provider may be internal or external, as discussed in further detail hereinafter. For instance, with reference to FIG. 1, first claims provider may be claims provider 128, claims provider 132, or claims provider 118. In either case, resource access controller 126 provides an authentication request to the first claims provider, or directs the user to the first claims provider, and in response receives the first claims that are generated at the first claims provider.

In step 208, a second claims provider is determined in the authentication flow, the second claims provider having a trust relationship with the claims facilitator. For instance, with reference to FIG. 1, authentication flow manager 124 may determine claims provider 118 or any other claims provider as the second claims provider in authentication flow 130, where the second claims provider has a previously established trust relationship with claims facilitator 112. An example process for establishing a trust relationship is described in detail elsewhere herein.

In step 210, the user is directed to the second claims provider. For instance, with reference to FIG. 1, authentication flow manager 124 directs the user to claims provider 118 such that the user can complete the required procedure. Claims provider 118 may request the user to provide information, such as a code, a biometric input (e.g., retinal scan, fingerprint scan, etc.), and/or other information that claims provider 118 uses for authentication.

In step 212, second claims for the user are received from the second claims provider. For instance, with reference to FIG. 1, resource access controller 126 receives second claims for the user from claims provider 118 when the user completes the procedure at claims provider 118.

In step 214, the user is enabled to access the resource in response to at least the first and second claims. For instance, with reference to FIG. 1, resource access controller 126 compares the received first and second claims to the corresponding expected first and second value sets and enables the user access to resource 120 if all comparisons of received claims and expected values match or are otherwise satisfied. Resource access controller 126 denies the user access to resource 120 if all comparisons of received claims and expected values doe not match or are otherwise not satisfied (e.g., all claims are not received, etc.).

Figure 3:
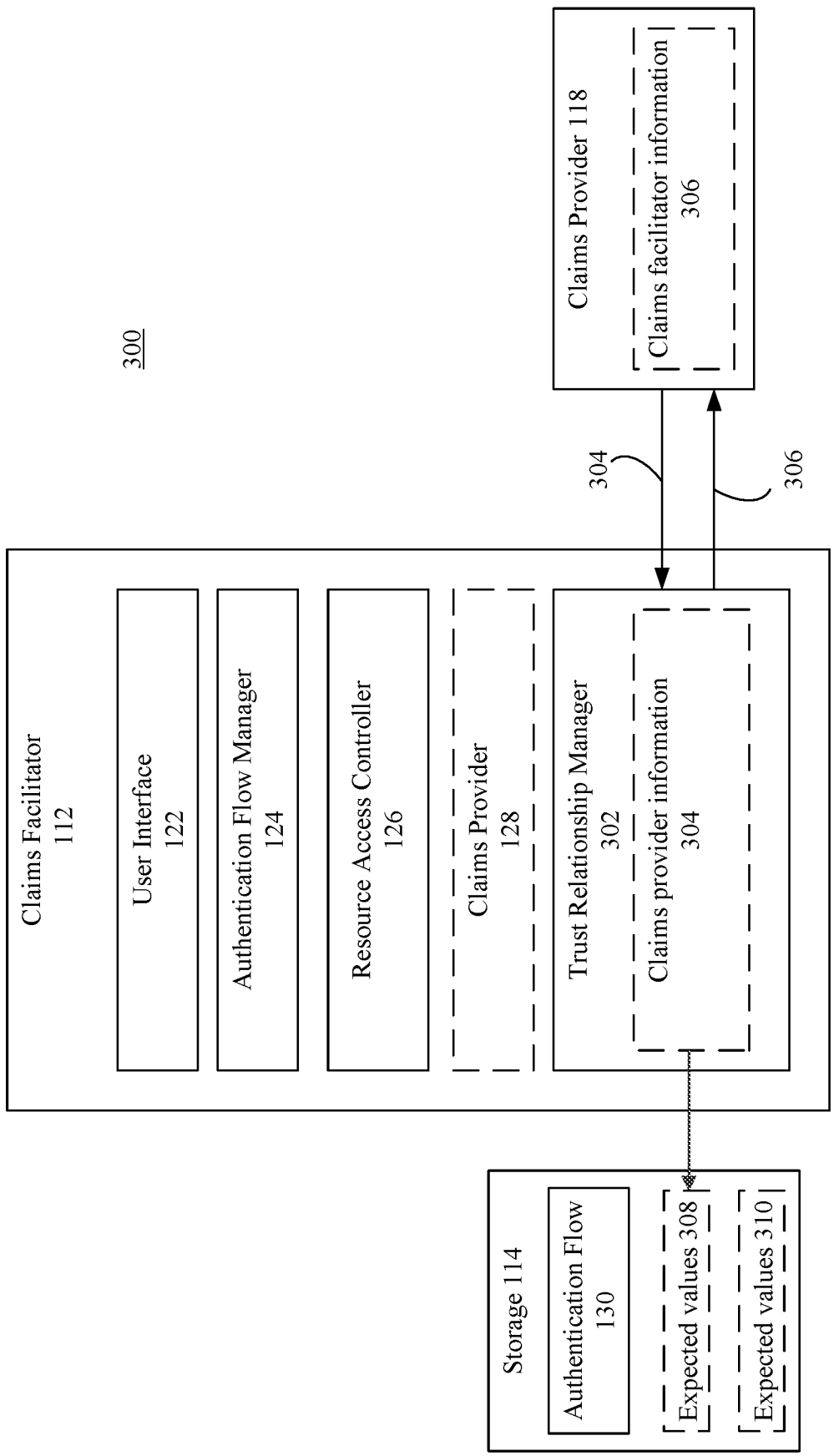
FIG. 3 shows a block diagram of a system for enabling access to a resource via multiple authentication procedures in an extensible manner, where the system includes a claims facilitator and an external claims provider, according to an example embodiment.

As described above, authentication flow 130 may include an external claims provider in its ordered list of claims providers if a trust relationship is first established between the external claims provider and claims facilitator 112. For instance, FIG. 3 shows a block diagram of a system 300 for enabling access to a resource via multiple authentication procedures in an extensible manner, according to an example embodiment. As shown in FIG. 3, system 300 includes claims facilitator 112, storage 114, and external claims provider 118 of FIG. 1. Claims facilitator 112 includes user interface 122, authentication flow manager 124, resource access controller 126, optional claims provider 128 and a trust relationship manager 302. The features of system 300 are described as follows with respect to FIGS. 3 and 4A-4C.

Trust relationship manager 302 is configured to enable a trust relationship to be established with claims providers, including external claims providers. For instance, as shown in FIG. 3, trust relationship manager 302 may transmit claims facilitator information 306 to claims provider 118.

Claims facilitator information 306 contains identifying information (e.g., an identifier, address, etc.) for claims facilitator 112. Claims facilitator information 306 enables claims provider 118 to ascertain that the user is being redirected from claims facilitator 112 to claims provider 118 during an authentication flow. In response to receiving and storing claims facilitator information 306, claims provider 118 transmits claims provider information 304 to trust relationship manager 302. Claims provider information 304 includes identifying information (e.g., an identifier, an address, etc.) associated with claims provider 118. For instance, when a user completes an authentication procedure at claims provider 118 and is redirected back to claims facilitator 112, claims facilitator 112 is enabled to accurately determine that the user returned from claims provider 118. Claims provider information 304 may further define a claims provider URL. In this way, claims facilitator 112 can accurately direct the user to claims provider 118 as desired. Additionally, claims provider information 304 further includes expected values for sets of claims associated with users. In this example, and as shown in FIG. 3, claims provider information 304 includes expected values 308, which are stored in storage 114. Expected values 308 are the expected values for claims (success criterion) generated by claims provider 118 during a successful authentication of a user. Storage 114 also stores expected values 310. Expected values 310 are the expected values for claims (success criterion) generated by claims provider 128 during a successful authentication of a user. Storage 114 may store further sets of expected values corresponding to any further numbers of claims providers.

Once claims provider 118 and trust relationship manager 302 have exchanged the appropriate information, trust relationship manager 302 may establish the trust relationship formed between claims facilitator and claims provider 118. For example, trust relationship manager 302 may list claims provider 118 in a list of trusted claims providers, with the obtained claims provider information 304. Examples of the additional information stored by trust relationship manager 302 and external claims providers to establish trust relationships are described elsewhere herein.

Figure 4A:
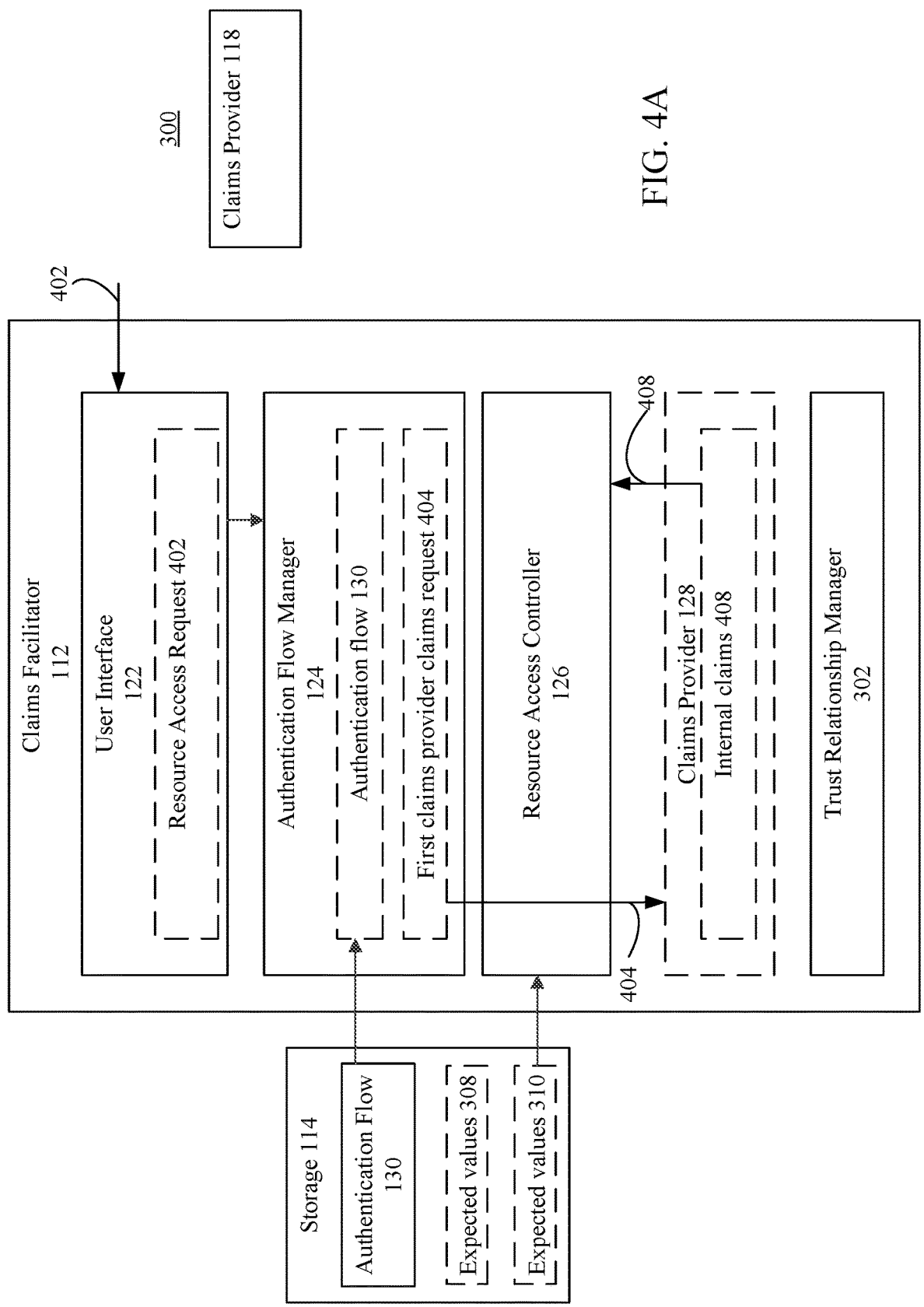
FIGS. 4A-4C show block diagrams of the system of FIG. 3, illustrating interactions between the claims facilitator and an external claims provider, according to example embodiments.
Figure 4B:
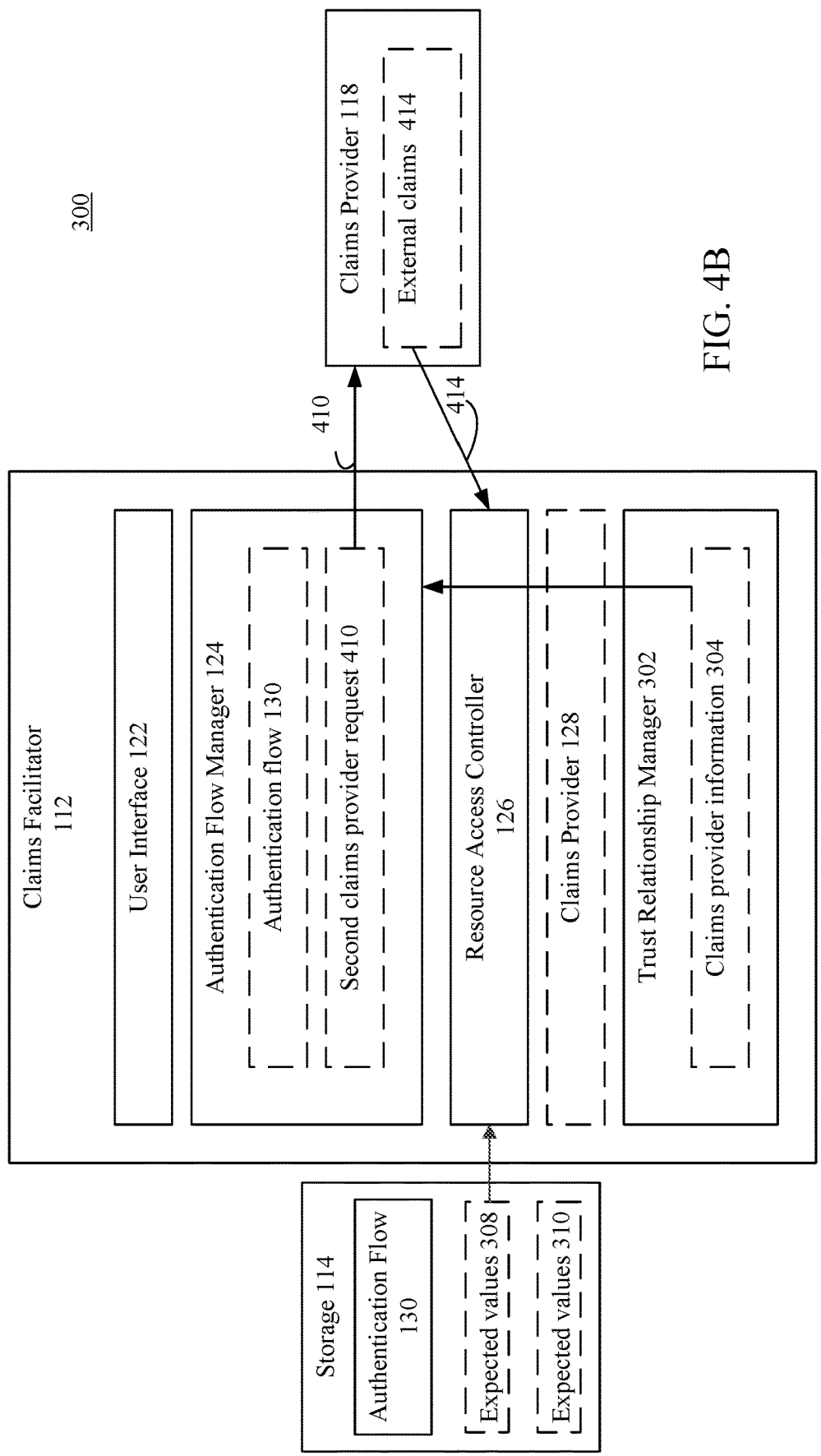
Figure 4C:
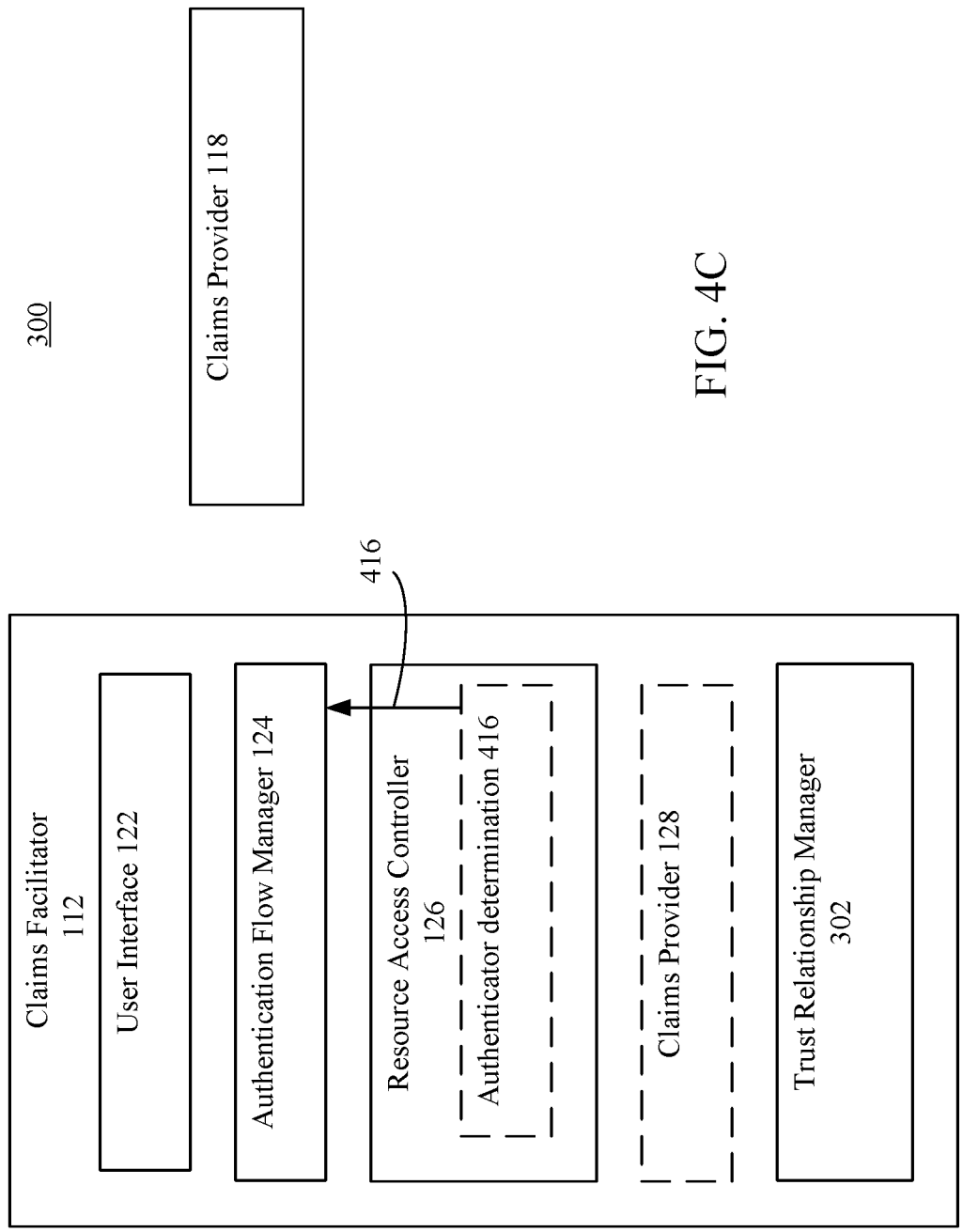

According to embodiments, a user of a computing device, such as computing device 102 of FIG. 1, is enabled to access a resource by claims facilitator 112. Example processes for enabling such access in system 300 are illustrated with respect to FIGS. 4A-4C. FIGS. 4A-4C illustrate communications of information within system 300 regarding enabling or preventing a user access to a resource, as well as exemplary forms that may enable the user to perform required procedures, in embodiments. FIGS. 4A-4C are described as follow.

As shown in FIG. 4A, system 300 includes claims facilitator 112 and claims provider 118. Claims facilitator 112 includes user interface 122, authentication flow manager 124, resource access controller 126, claims provider 128 and trust relationship manager 302 of FIG. 3. As shown in FIG. 4A, and with continued reference to FIG. 1, user interface 122 receives a resource access request 402. For instance, a user may interact with user interface 122 to input a request for a resource, such as resource 120 of FIG. 1. As shown in FIG. 4A, authentication flow manager 124 receives an indication of resource access request 402, and in response obtains authentication flow 130 from storage 114 corresponding to resource 120 indicated in request 402. In this example, authentication flow 130 lists claims provider 128 and claims providers 118 as first and second claims providers providing authentication procedures to be performed to give the user access to resource 120. In this example, trust relationship manager 302 indicates that a trust relationship is maintained between claims facilitator 112 and claims provider 118. A trust relationship may be assumed between claims facilitator 112 and claims provider 128 (due to claims facilitator 112 being internal to claims facilitator 112). Alternatively, the trust relationship may be established between claims facilitator 112 and claims provider 128 by trust relationship manager 302 in a similar manner as for external claims providers.

To proceed with authentication flow 130, authentication flow manager 124 generates a first claims provider request 404 associated with claims provider 128 as the first claims provider in authentication flow 130 (e.g., step 206 of FIG. 2). Authentication flow manager 124 transmits first claims provider request 404 to claims provider 128. In response, claims provider 128 prompts the user to perform an authentication procedure, examples of which are described elsewhere herein. In response to the user completing the authentication procedure, internal claims 408 are generated by claims provider 128 and transmitted to resource access controller 126. Resource access controller 126 retrieves expected values 310 from storage 114 and compares local claims 408 to expected values 310 to determine if success criterion is achieved for claims provider 128.

Referring to FIG. 4B, and as noted above, external claims provider 118 is determined to be the second claims provider as indicated by authentication flow 130. As such, authentication flow manager 124 generates a second claims provider request 410. Authentication flow manager 124 further retrieves claims provider information 304 from trust relationship manager 302. Using claims provider information 304, which includes the URL for external claims provider 118, authentication flow manager 124 directs the user to claims provider 118 (e.g., step 210 of FIG. 2). For instance, user interface 122 generated by claims facilitator 112 may navigate to the URL and display an interface for the user, or otherwise enable the user to be directed to claims provider 118 to perform the authentication procedure. Authentication flow manager 124 transmits a second claims provider request 410 to claims provider 118 as a request for the claims to be generated by claims provider 118 for the user.

In response, claims provider 118 prompts the user to perform an authentication procedure, examples of which are described elsewhere herein. User interface 122 (and/or other user interface) may enable the user to provide any information (e.g., passcode, login name, retinal scan, fingerprint scan, etc.) that claims provider 118 uses to perform its particular form of authentication for the user. In response to the user completing the authentication procedure, external claims 414 are generated by claims provider 118 and transmitted to resource access controller 126. Resource access controller 126 retrieves expected values 308 from storage 114. Resource access controller 126 then compares external claims 414 to expected values 308 to determine if success criterion is achieved for claims provider 118.

Referring to FIG. 4C, resource access controller 126 determines whether to enable the user to access resource 120 based on the success criterion of the claims returned from claims provider 128 and claims provider 118. As shown in FIG. 4C, resource access controller 126 generates an authenticator determination 416 for the user based on the received internal claims and received external claims. As noted above, if the received internal claims and external claims match the respective stored expected values, authenticator determination 416 is generated to indicate that access is granted to resource 120. Alternatively, if at least one of the received internal claims and external claims do not match or contain less than the expected values for the respective stored internal claims and external claims, authenticator determination 416 is generated to indicate that access is denied to resource 120.

Accordingly, and as described above, authentication manager 124 uses authentication flow 130 to enable a user to obtain access to a resource by directing the user to the appropriate claims providers to complete the associated procedures. Note that any of the first and second (and subsequent) claims providers may be internal or external to claims facilitator 112.

Various flowcharts are described as follows that may be performed by claim facilitator embodiments described herein, as well as in flowchart 200 of FIG. 2. For instance, FIG. 5 shows a flowchart 500 for obtaining the first claims from an internal claims provider, according to an example embodiment. Flowchart 500 may be implemented by claims facilitator 112 of FIGS. 1, 3 and 4, in embodiments. Flowchart 500 is described as follows. Other structural and operational embodiments will be apparent to persons skilled in the relevant art(s) based on the following discussion regarding flowchart 500.

Flowchart 500 begins with step 502. In step 502, a procedure is performed in the first claims provider located in the computing device of the claims facilitator to generate the first claims. For example, with reference to FIG. 4A, if the first claims provider in authentication flow 130 is determined to be claims provider 128, the user is directed to claims provider 128. Claims provider 128 is located within claims facilitator 112, enables the users to complete the procedure, and generates the associated first claims.

Alternatively, a claims provider in authentication flow 130 may be external. For instance, FIG. 6 shows another flowchart 600 for obtaining the first claims, according to an example embodiment. Flowchart 600 may be implemented by claims facilitator 112 of FIGS. 1, 3 and 4, in embodiments. Flowchart 600 is described as follows. Other structural and operational embodiments will be apparent to persons skilled in the relevant art(s) based on the following discussion regarding flowchart 600.

Flowchart 600 begins with step 602. In step 602, the first claims provider is determined in the authentication flow, the first claims provider being external to the computing device and having a trust relationship with the claims facilitator. For example, and with reference to FIG. 1, FIG. 3 and FIG. 4B, the first claims provider may be determined to be claims provider 118, which has an established trust relationship with claims facilitator 112.

In step 604, the user is directed the first claims provider. For instance, the user is directed to claims provider 118 by authentication flow manager 124, as described above with respect to FIG. 4B.

At step 606, the first claims are received from the first claims provider. For example, with reference to FIGS. 1 and 4B, claims provider 118 enables the user to complete the required procedure at claims provider 118, and generates claims based thereon. Resource access controller 126 of claims facilitator 112 receives the generated claims from claims provider 118.

Any number of claims providers may be included in an authorization flow, including greater numbers than two. For instance, FIG. 7 shows a flowchart 700 for obtaining additional claims from additional claims providers, according to an example embodiment. Flowchart 700 may be performed as additional steps to flowchart 200 (FIG. 2), and may be implemented by claims facilitator 112 of FIGS. 1, 3 and 4, in embodiments. Flowchart 700 is described as follows. Other structural and operational embodiments will be apparent to persons skilled in the relevant art(s) based on the following discussion regarding flowchart 700.

Flowchart 700 begins with step 702. In step 702, at least one additional claims provider is determined in the authentication flow, where the at least one additional claims provider has a trust relationship with the claims facilitator. For example, with reference to FIG. 1, an additional claims provider may be determined in authentication flow 130 that has a previously established trust relationship with claims facilitator 112. For instance, claims providers 118 and 128 may be a first two claims providers in authentication flow 130, and claims provider 132 may be an additional claims provider in authentication flow 130.

At step 704, the user is directed to the at least one additional claims provider. For example, authentication flow manager 124 may direct the user to the additional claims provider (e.g., claims provider 132) such that the user is enabled to complete the required procedure at the additional claims provider.

At step 706, additional claims corresponding to the at least one additional claims provider are received from the at least one additional claims provider. Resource access controller 126 may receive additional claims from any subsequent claims providers in authentication flow 130.

As noted above, resource access controller 126 determines whether the user is enabled or prevented access to a particular resource based on the comparison of the received claims and the stored expected claims. Accordingly, every time an additional claims provider is determined in the authentication flow, resource access controller 126 compares the additionally received claims to the stored expected claims. For instance, FIG. 8 shows another flowchart 800 for enabling access to a resource based on multiple successful authentications, according to an example embodiment. Flowchart 800 may be implemented by resource access controller 126 of FIGS. 1, 3 and 4C, in embodiments. Flowchart 800 is described as follows. Other structural and operational embodiments will be apparent to persons skilled in the relevant art(s) based on the following discussion regarding flowchart 800.

Flowchart 800 begins with step 802. In step 802, the user is enabled accessed to the resource in response to the first claims, the second claims, and the additional claims corresponding to the at least one additional claims providers. For example, and with reference to FIG. 1, the resource access controller 126 makes a comparison of the claims received from each claims provider in authentication flow 130 to the corresponding stored expected claims. If all of the received claims match the corresponding stored expected claims, resource access controller 126 enables the user access to resource 120. If any of the received claims do not match or contain less than the corresponding stored claims, resource access controller 126 prevents the user access to resource 120.

As noted above, if an external claims provider is used in the authentication flow, the external claims provider must first have an established trust relationship with the claims facilitator. For instance, FIG. 9 shows a flowchart 900 for establishing trust relationships, according to an example embodiment. Flowchart 900 may be implemented by trust relationship manager 302 of FIGS. 3 and 4, in embodiments. Flowchart 900 is described as follows. Other structural and operational embodiments will be apparent to persons skilled in the relevant art(s) based on the following discussion regarding flowchart 900.

Flowchart 900 begins with step 902. In step 902, prior to receiving the request for access to the resource, a trust relationship is established with at least the second claims provider. For instance, trust relationship manager 302 establishes a trust relationship with claims provider 118 by receiving claims provider information 304 from claims provider 118 and transmitting claims facilitator information 306 to claims provider 118, as described above.

For instance, FIG. 10 shows another flowchart 1000 for configuring a trusted claims provider, according to an example embodiment. Flowchart 1000 may be implemented by trust relationship manager 302 of FIGS. 3 and 4, in embodiments. FIG. 10 is described as follows. Other structural and operational embodiments will be apparent to persons skilled in the relevant art(s) based on the following discussion regarding flowchart 1000.

Flowchart 1000 begins with step 1002. In step 1002, store, for the second claims provider, an identifier for the second claims provider, an address for accessing the second claims provider, one or more controls that enable one or more claims to be requested from the second claims provider, and expected values for the one or more claims. For example, as shown in FIG. 3, claims provider information 304 corresponding to claims provider 118 is maintained (e.g., in storage) by trust relationship manager 302. In embodiments, claims provider information 304 includes an identifier for second claims provider 118, an address for accessing second claims provider 118, one or more controls that enable one or more claims to be requested from second claims provider 118, and expected values for the one or more claims.

As noted above, the resource access controller determines whether to enable or prevent the user access to the resource based on the received claims. For instance, FIG. 11 shows another flowchart 1100 for enabling access to a resource, according to an example embodiment. Flowchart 1100 may be implemented by resource access controller 126 of FIGS. 3 and 4A, in embodiments. Flowchart 1100 is described as follows. Other structural and operational embodiments will be apparent to persons skilled in the relevant art(s) based on the following discussion regarding flowchart 1100.

Flowchart begins with step 1102. In step 1102, a first compare is made of the generated first claims to the stored expected values for the first claims is made. For instance, and with reference to FIG. 4A, resource access controller 126 receives internal claims 408 (first), and compares them to stored expected values 310 corresponding to claims provider 128.

In step 1104, a second compare is made of the received second claims to the stored expected values for the second claims. For instance, and with reference to FIG. 4B, resource access controller 126 receives external claims 414 (second), and compares them to stored expected values 308.

In step 1106, whether to enable the user access to the resource based on the results of the first compare and the second compare is determined. For example, and with reference to FIG. 4C, resource access controller 126 makes a determination of whether the enable the user access to the resource by comparing internal (first) claims 408 and external claims 414 (second) to the respective expected claims. If all match, access to the resource by the user is granted. If any do not match, access to the resource by the user is denied.

As noted above, an administrator is enabled to define an authentication flow for a user. For instance, FIG. 12 shows a flowchart 1200 for enabling the defining of the authentication flow, according to an example embodiment. Flowchart 1200 may be implemented at administrator user interface 116 of FIG. 1, in an embodiment. Flowchart 1200 is described as follows. Other structural and operational embodiments will be apparent to persons skilled in the relevant art(s) based on the following discussion regarding flowchart 1200.

Flowchart 1200 begins with step 1202. In step 1202, an administrator is enabled to define the authentication flow. For instance, and with reference to FIG. 1, an administrator is enabled to define authentication flow 130 via administrator user interface 116.

III. Further Embodiments and Additional Details

This section describes additional embodiments and further details to embodiments described elsewhere herein. The embodiments described in this subsection may be combined with each other in any manner, and can be combined with embodiments described elsewhere herein in any manner.

Embodiments encompass systems, methods, and apparatuses for enabling access to a resource using extensible authentication flows. Compliance procedures (e.g., agreeing to a Terms of Use agreement) and confirmation procedures are considered examples of authentication procedures that may be included in an authentication flow. In one embodiment, a user requests access to a resource. An authentication flow is accessed for granting access to the resource. First claims for the user are obtained from a first claims provider in the authentication flow. A second claims provider is determined in the authentication flow having a trust relationship with the claims facilitator. The user is directed to the second claims provider. Second claims for the user are received from the second claims provider. The user is enabled to access the resource based at least on the first and second claims (and optionally further claims).

As described above, an administrator is enabled to customize authentication flows that invoke internal and external claims providers, where trust relationships are established with the claims providers. In an authentication flow, a user may be required to perform a procedure at an external claims provider. The procedure may encompass a compliance technique/procedure, which may require the user to accept a 'Terms of Use' at a claims provider, and/or may require the user to perform other procedures described elsewhere herein or otherwise known. The invocation of an external claims provider may be driven by a policy (e.g., a conditional access policy) that specifies the providers as "controls" required to satisfy the conditions of a policy. Additional example details regarding how external claims providers and administrators use the controls enabled by the connected are described as follow.

As described above, an external claims provider has a trust relationship with the central server or platform in order to be used in an authentication flow. In a cloud-based embodiment, to configure a new external claims provider, the administrator may perform the following process. The administrator may create a tenant at the central server or platform (e.g., Microsoft® Azure® Active Directory®) if one does not yet exist. An application is created at the central server or platform using that tenant. The application is set to be multi-tenanted. The external claims provider valid redirect URL is added to the application as ReplyURLs. The application registration process results in the creation of an application with several properties. In an embodiment, the application properties shown below in Table 1 may be used.

TABLE 1

| Property | Description |
| --- | --- |
| Object Id | The claims provider could use this id to retrieve and edit the application information programmatically. |
| Application ID | This is used by the provider as their ClientId. |
| Home page URL | The provider home page url, which may be requested as part of application registration. |
| ReplyURLs | Valid redirect URLs for the provider. One of these should match the provider host URL that was set for the resource provider tenant. |

In embodiments, the claim provider information is stored in the tenant's default policy as a JSON (JavaScript Object Notation) (or another format) list of claimsproviders. Each claims provider has one or more entries in the claimsproviders list object of the policy, and each entry has one or more specified Controls that can be used by an admin in creating policies. For instance, and in an embodiment, a claimsproviders entry may have the members shown below in Table 2:

TABLE 2

| Member name | Description |
| --- | --- |
| Name | Name of the provider. May be unique per policy, so as to serve as a provider identifier within the policy. |
| AppId | The provider client id. This is the application identifier that was generated for the provider during its registration as an application. |
| ClientId | The resource provider client id. This is the identifier generated by the provider for resource provider. |
| DiscoveryUrl | This is the host URL of the provider, which should support the OIDC (OpenID Connect) discovery process. |
| Controls | A list of named controls that the tenant can use in their CA policies. An example of these controls is shown in Table 3 below. |

In embodiment, an example entry includes:

```
"ClaimProviders": [{
    "ClaimProvider": {
        "Name": "Relecloud Authentication",
        "AppId": "6a2d4ab0-582f-4c49-8f0a-350e77d3a630",
        "ClientId": "d8f93383-a637-41cd-9c27-eaf103a87b02",
        "DiscoveryUrl": "https://www.relecloud.com/contose/" },
        "Controls": [
        { "Text": "Require Relecloud Retina Scan",
            "ClaimsRequested": [
                { "Type": "mfa", "Value": "retinascan" }]},
        { "Text": "Require Relecloud Phone Auth",
            "ClaimsRequested": [
                { "Type": "mfa", "Value": "phone" }]}]},
        ...
]
```

Thus, each time the central server or platform loads a claimsproviders entry it verifies that the prefix of the authorization endpoint retrieved through discovery using the host URL matches one of the reply URLs registered to the claims provider identified by the ClientID. In this way, this verification ties the AppID to the HostUrl and ensures that they go together.

In an embodiment, the controls member is a list of claims, each of which may have the following members and corresponding descriptions shown below in Table 3:

TABLE 3

| Member name | Description |
| --- | --- |
| Text | A descriptive name for the control that is used as a description in the UX. May be unique per policy and should precisely and succinctly describe the control. |
| ClaimsRequested | A list of claim entities that are requested to fulfill this control. Each claim entity has two string properties: Type and Value. |

In embodiments, the claims provider passes JSON (or another data format) data to the tenant. A claims provider may generate a block of JSON (or another data format) as described below and provide that block to each tenant. The tenant may paste that block into the central server or platform user interface to create the controls that the tenant may later use to authenticate with the claims provider.

In embodiments, the JSON (or another data format) may be a single entity, enclosed in braces, containing: Name, AppId, ClientId, DiscoveryUrl, and Controls, and their associated values. Those values are set to be used by the tenant to communicate with the claims provider, and they can be global (preferred) or tenant-specific as needed by the claims provider.

An example claims provider entry is shown as follows:

```
{
    "Name": "Relecloud Authentication",
    "AppId": "6a2d4ab0-582f-4c49-8f0a-350e77d3a630",
    "ClientId": "d8f93383-a637-41cd-9c27-eaf103a87b02",
    "DiscoveryUrl": "https://www.relecloud.com/contose/" },
    "Controls": [
        { "Text": "Require Relecloud Eyeball Scan",
            "ClaimsRequested": [
                { "Type": "mfa", "Value": "eyeballscan" }]},
        { "Text": "Require Relecloud Phone Auth",
            "ClaimsRequested": [
                {"Type": "mfa", "Value": "phone" }]}]
}
```

In embodiments, the central server or platform has interactions with the claims provider. For instance, a claims provider may need to provide an OIDC Discovery endpoint. This endpoint is used to retrieve additional configuration data, and may be found by appending the ".well-known/openid-configuration" path to the host URL. The endpoint in response may return a Provider Metadata JSON (or another data format) document hosted there.

Table 4 below lists example data that may be present in the metadata of the claims providers. The JSON metadata document may contain additional information in addition to these fields that are required for this extensibility scenario.

In embodiments, equivalent to the central server or platform using the discovery process to retrieve the public keys necessary to verify the signatures of the tokens issued by claim providers, those providers also need to retrieve the public keys of the central server or platform for validating the tokens issued by the central server or platform. This is done starting from the Iss claim of the central server or platform token, which specifies the tenant's host URL. This may have the following example form:

https://sts.windows.net/[tenant_id]/

From this host URL, we can build the discovery URL by appending .well-known/openid-configuration:

https://sts.windows.net/[tenant_id]/. well-known/openid-configuration

In the resulting JSON metadata is the Issuer property specifying the same host URL that was present in the Iss claim.

Using the public key identifier from the token (the "kid" from JWS (JSON Web Signature)), one can determine which of the keys retrieved from the jwks_uri property may be used for validating the identity and access manager token signature.

Note that in the tenant_id part of the host URL, the central server or platform may use the tenant's GUID or the tenant's name interchangeably. However, the URL specified within the Iss claim of the tokens issued for this tenant uses the GUID version only.

In embodiments, to prevent the central server or platform from making a discovery call each time it communicates with a claims provider, the central server or platform caches the metadata returned. The authentication service may use the OIDC implicit flow to communicate with the claims provider. Using this flow, communication with the claims provider is done exclusively via the authorization endpoint. To let the claims provider know on whose behalf the central server or platform is making the request, the central server or platform may pass a token in through the id_token_hint

TABLE 4

| Metadata value | Value | Comments |
| --- | --- | --- |
| Issuer | | This URL should match the Iss claim in the tokens issued by this service. |
| authorization_endpoint | | The endpoint that the identity and access manager may communicate with for authorization. |
| jwks_uri | | This tells us where the identity and access manager can find the public keys needed to verify the signatures issued by the provider. |
| scopes_supported | openid | Other values may be included as well but not required. |
| response_types_supported | id_token | Other values may be included as well but not required. |
| subject_types_supported | | |
| id_token_signing_alg_values_supported | | |
| claim_types_supported | normal | This property is optional but if present, it may include the normal value; other values may be included as well. |
| claims_supported | | This tells the identity and access manager which claims are expected, so the identity and access manager can check if the claim required in the policy can be issued. | parameter. This call may be made through a POST request, as the list of parameters passed to the provider is large and there are potential issues with browsers limiting the length of a GET request.

In embodiments, the Authentication request parameters may be those shown below in Table 5:

TABLE 5

| Authentication Query Parameter | Value | Description |
| --- | --- | --- |
| Scope | Openid | |
| response_type | Id_token | The value used for the implicit flow. |
| response_mode | form_post | We use form post to avoid issues with large URLs. The parameters may all be sent in the body of the request. |
| client_id | | The identity and access manager client id registered with the provider |
| redirect_uri | | The redirection URI to which the response is sent. This may be registered with the provider off-band. |
| nonce | | A random string generated by the identity and access manager - can be the session id. |
| state | | If passed in, the provider may return this in its response. the identity and access manager may use this to keep context about the call, possibly by storing the user's OID in it the field. State is composed of the serialized request and the flow token split with a dot. AAD needs both to recreate the state once the provider returns an id_token to AAD. |
| id_token_hint | | This is a token issued by the identity and access manager for the end user and passed in for the benefit of the provider. |
| claims | | A JSON blob containing the claims requested. See section on claims request parameter from OIDC documentation for details on the format of this parameter. The provider does not have to support the claims parameter. This is provided to help the provider know what the identity and access manager expects from it. The provider can use this information to customize the experience. |

The content of the token passed as id_token_hint in the request made to the claims provider may include the claims identified below in Table 6.

TABLE 6

| Claim | Value | Description |
| --- | --- | --- |
| Iss | | Issuer - should match the issuer URL from the tenant's OIDC discovery JSON. |
| Aud | | Audience - this may be set to the provider's client id. |
| Exp | | Expiration time - this is set to expire a short time after the issuing time (sufficient to avoid timeskew issues). This may be done because this token is not meant for authentication, so there is no reason for its validity to outlast the request by much. |
| Iat | | Issuing time |
| Tid | | Tenant Id - for advertising the tenant to the provider. |
| Oid | | Object Id - the identity and access manager identifier of the user. |
| unique_name | | Provides a human readable value that identifies the subject of the token. This value need not be guaranteed to be unique within a tenant and is designed to be used only for display purposes. |
| upn | | User name of the user principal. |

In embodiments, to prevent the token for being used for anything else other than a hint, it is issued as expired. In the implicit flow, the response parameters are added to the fragment component of the redirection URI. In an embodiment, the parameters shown below in Table 7 may be provided on a successful response:

TABLE 7

| Parameter | Value | Description |
| --- | --- | --- |
| token_type | Bearer | |
| id_token | | The token issued by the provider. |
| State | | Same value that was passed in the request, if any; otherwise, this need not be present. |

On success, the claims provider issues a token for the user. The central server or platform verifies that the token contains the expected claims as well as all the other validation of the token that OIDC requires, such as those shown in Table 8 below.

TABLE 8

| Claim | Value | Description |
| --- | --- | --- |
| Iss | | Issuer - should match the issuer from the provider's discovery metadata. |
| Aud | | Audience - the identity and access manager client id. |
| Exp | | Expiration time - set as usual. |
| Iat | | Issuing time - set as usual. |
| "requested policy claim" | | The claim that the identity and access manager CA policy expected. |

If no issues are found with the token, the central server or platform may issue a token to the end user. Otherwise, the end user's request is failed.

In embodiments, failure is indicated by issuing Error Response parameters, an example of which is shown below in Table 9:

TABLE 9

| Parameter | Value | Description |
|---|---|---|
| Error | | An ASCII error code, such as access_denied or temporarily_unavailable. |

The authentication service may consider the request successful if the id_token parameter is present in the response and if its token is valid and contains the claims required by the CA policy. Otherwise, the request is considered unsuccessful and the central server or platform may fail the original call due to policy requirement.

Two example techniques for user provisioning and configuration in claims providers are described as follows:

The users can be imported into the providers and a synchronization mechanism can keep the claim provider's list of users in sync with the central server or platform. This can be done using, for example SCIM (System for Cloud Identity Management), Microsoft® Graph, etc. The users may be provisioned on demand, as they make requests that get redirected to the provider, in batch, or in another manner.

In another embodiment, users may sign in to the claims provider via the central server or platform. An id_token_hint would not be required. The claims provider processes the id_token issued by the central server or platform similarly to how they processed the central server or platform token passed as hint. The claims provider may ensure that the redirect_uri specified in their authentication request matches the one of the reply URLs specified in their application registration.

IV. Example Computer System Implementation

Computing device(s) 102, Computing device(s) 104, Computing device(s) 106, Computing device(s) 108, claims facilitator 112, storage 114, administrator user interface 116, claims provider 118, resource 120, flowchart 200, flowchart 500, flowchart 600, flowchart 700, flowchart 800, flowchart 900, flowchart 1000, flowchart 1100, and flowchart 1200 may be implemented in hardware, or hardware combined with software and/or firmware. For example, claims facilitator 112, storage 114, administrator user interface 116, claims provider 118, resource 120, flowchart 200, flowchart 500, flowchart 600, flowchart 700, flowchart 800, flowchart 900, flowchart 1000, flowchart 1100, and flowchart 1200 may be implemented as computer program code/instructions configured to be executed in one or more processors and stored in a computer readable storage medium. Alternatively, claims facilitator 112, storage 114, administrator user interface 116, claims provider 118, resource 120, flowchart 200, flowchart 500, flowchart 600, flowchart 700, flowchart 800, flowchart 900, flowchart 1000, flowchart 1100, and flowchart 1200 may be implemented as hardware logic/electrical circuitry.

For instance, in an embodiment, one or more, in any combination, of claims facilitator 112, storage 114, administrator user interface 116, claims provider 118, resource 120, flowchart 200, flowchart 500, flowchart 600, flowchart 700, flowchart 800, flowchart 900, flowchart 1000, flowchart 1100, and flowchart 1200 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 13:
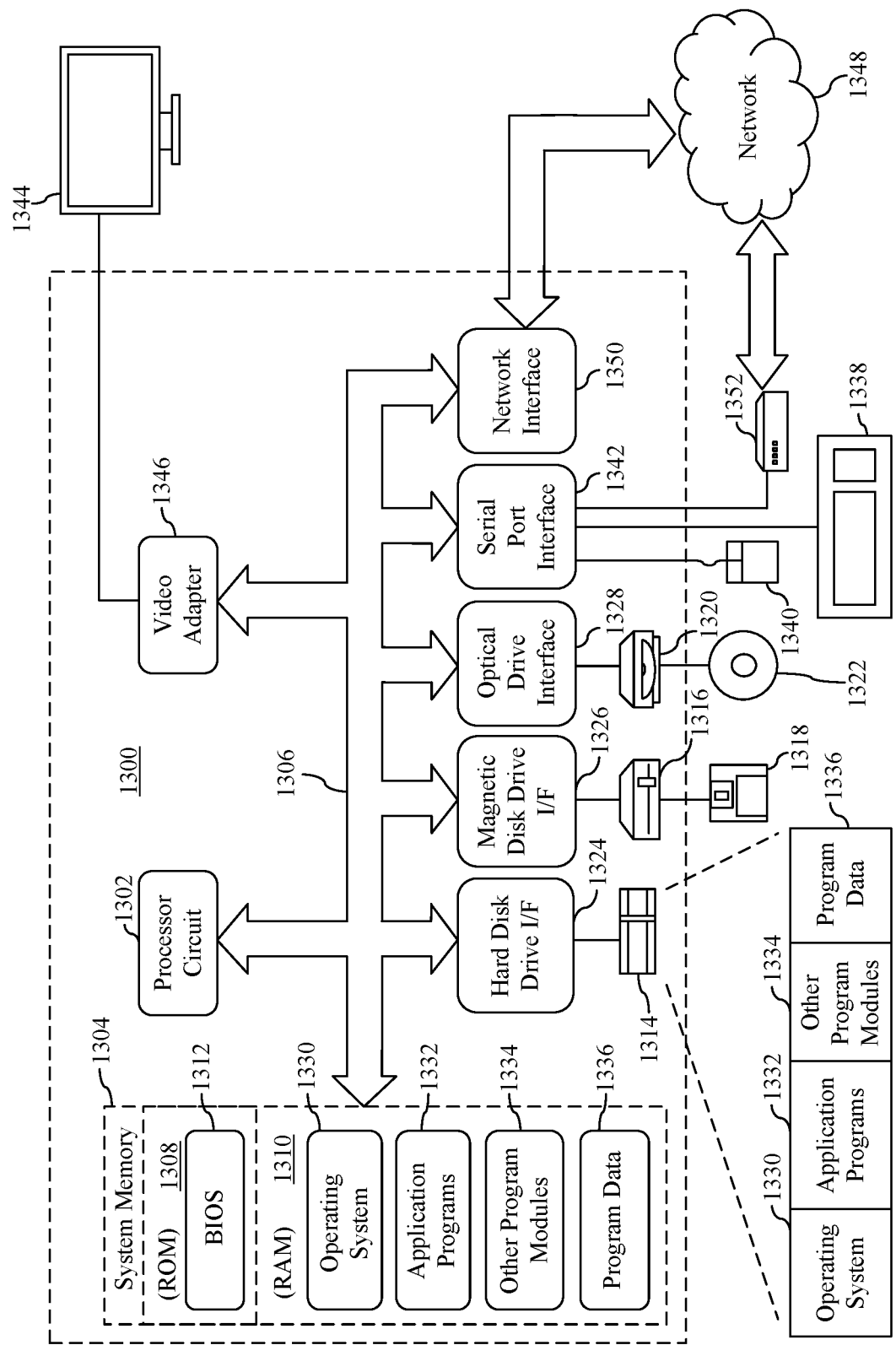
FIG. 13 is a block diagram of an example processor-based computer system that may be used to implement various embodiments.

FIG. 13 depicts an exemplary implementation of a computing device 1300 in which embodiments may be implemented. For example, computing device(s) 102, computing device(s) 104, computing device(s) 106, and computing device(s) 108 may each be implemented in one or more computing devices similar to computing device 1300 in stationary or mobile computer embodiments, including one or more features of computing device 1300 and/or alternative features. The description of computing device 1300 provided herein is provided for purposes of illustration, and is not intended to be limiting. Embodiments may be implemented in further types of computer systems, as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1034 may include, for example, computer program logic (e.g., computer program code or instructions) for implementing claims facilitator 112, storage 114, administrator user interface 116, claims provider 118, resource 120, flowchart 200, flowchart 500, flowchart 600, flowchart 700, flowchart 800, flowchart 900, flowchart 1000, flowchart 1100, and flowchart 1200, and/or further embodiments described herein.

A user may enter commands and information into the computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium" are used to refer to physical hardware media such as the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments discussed herein. Accordingly, such computer programs represent controllers of the computing device 1300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Additional Example Embodiments

A claims facilitator is described herein. The claims facilitator is implemented in a computing device and configured to enable access to a resource. The claims facilitator includes: an authentication flow manager configured to: receive, from a user, a request for access to the resource; access an authentication flow for granting access to the resource; obtain first claims for the user from a first claims provider in the authentication flow, determine a second claims provider in the authentication flow, the second claims provider having a trust relationship with the claims facilitator, direct the user to the second claims provider, and receive second claims for the user from the second claims provider. The claims facilitator further includes a resource access controller configured to enable the user to access the resource in response to at least the first and second claims.

In one embodiment of the foregoing claims facilitator, the first claims provider is implemented in the computing device and is configured to perform a procedure to generate the first claims.

In another embodiment of the foregoing claims facilitator, to obtain the first claims, the authentication flow manager is configured to: determine the first claims provider in the authentication flow, the first claims provider external to the computing device and having a trust relationship with the claims facilitator; direct the user to the first claims provider; and receive the first claims from the first claims provider.

In another embodiment of the foregoing claims facilitator, the authentication flow manager is further configured to: determine at least one additional claims provider in the authentication flow, the at least one additional claims provider having a trust relationship with the claims facilitator; direct the user to the at least one additional claims provider; and receive from the at least one additional claims provider additional claims corresponding to the at least one additional claims providers, and the resource access controller is further configured to: enable the user to access the resource in response to the received first claims, the second claims, and the additional claims corresponding to the at least one additional claims providers.

In another embodiment of the foregoing claims facilitator, the claims facilitator further comprises: a trust relationship manager configured to: prior to receiving the request for access to the resource, establish a trust relationships with at least the second claims provider; and store for the second claims provider: an identifier for the second claims provider; an address for accessing the second claims provider; one or more controls that enable one or more claims to be requested from the second claims provider; and expected values for the one or more claims.

In another embodiment of the foregoing claims facilitator, the resource access controller is configured to compare the generated first claims to stored expected values for the first claims, and to compare the received second claims to the stored expected values for the second claims, to determine whether to enable the user to access the resource.

In another embodiment of the foregoing claims facilitator, the authentication flow manager is further configured to: receive the authentication flow defined by an administrator.

A method in a computing device is described herein. The method includes receiving, from a user, a request for access to a resource; accessing an authentication flow for granting access to the resource; obtaining first claims for a user from a first claims provider in the authentication flow; determining a second claims provider in the authentication flow, the second claims provider having a trust relationship with the claims facilitator; directing the user to the second claims provider; receiving second claims for the user from the second claims provider; and enabling the user to access the resource in response to at least the received first and second claims.

In one embodiment of the foregoing method, the first claims provider is implemented in the computing device, and said obtaining first claims for a user from a first claims provider in the authentication flow comprises: performing a procedure in the first claims provider to generate the first claims.

In another embodiment of the foregoing method, said obtaining first claims for a user from a first claims provider in the authentication flow comprises: determining the first claims provider in the authentication flow, the first claims provider external to the computing device and having a trust relationship with the claims facilitator; directing the user to the first claims provider; and receiving the first claims from the first claims provider.

In another embodiment of foregoing method, the method further comprises determining at least one additional claims provider in the authentication flow, the at least one additional claims provider having a trust relationship with the claims facilitator; directing the user to the at least one additional claims provider; and receiving from the at least one additional claims provider additional claims corresponding to the at least one additional claims providers; and wherein said enabling the user to access the resource in response to at least the received first and second claims comprises: enabling the user to access the resource in response to the received first claims, the second claims, and the additional claims corresponding to the at least one additional claims providers.

In another embodiment of the foregoing method, the method further comprises prior to receiving the request for access to the resource, establishing a trust relationships with at least the second claims provider; and storing for the second claims provider: an identifier for the second claims provider; an address for accessing the second claims provider; one or more controls that enable one or more claims to be requested from the second claims provider; and expected values for the one or more claims.

In another embodiment of the foregoing method, said enabling the user to access the resource in response to at least the received first and second claims comprises: first comparing the generated first claims to stored expected values for the first claims; second comparing the received second claims to the stored expected values for the second claims; and determining whether to enable the user to access the resource based on results of said first comparing and said second comparing.

In another embodiment of the foregoing method, the method further comprises enabling an administrator to define the authentication flow.

A computer-readable medium having computer program logic recorded thereon that, when executed by at least one processor causes the at least one processor to perform a method, the method comprises: receiving, from a user, a request for access to a resource; accessing an authentication flow for granting access to the resource; obtaining first claims for a user from a first claims provider in the authentication flow; determining a second claims provider in the authentication flow, the second claims provider having a trust relationship with the claims facilitator; directing the user to the second claims provider; receiving second claims for the user from the second claims provider; and enabling the user to access the resource in response to at least the received first and second claims.

In one embodiment of the foregoing computer-readable medium, the first claims provider is implemented in the computing device, and said obtaining first claims for a user from a first claims provider in the authentication flow comprises: performing a procedure in the first claims provider to generate the first claims.

In another embodiment of the foregoing computer-readable medium, said obtaining first claims for a user from a first claims provider in the authentication flow comprises: determining the first claims provider in the authentication flow, the first claims provider external to the computing device and having a trust relationship with the claims facilitator; directing the user to the first claims provider; and receiving the first claims from the first claims provider.

In another embodiment of the foregoing computer-readable medium, the method further comprises: determining at least one additional claims provider in the authentication flow, the at least one additional claims provider having a trust relationship with the claims facilitator; directing the user to the at least one additional claims provider; and receiving from the at least one additional claims provider additional claims corresponding to the at least one additional claims providers; and said enabling the user to access the resource in response to at least the received first and second claims comprises: enabling the user to access the resource in response to the received first claims, the second claims, and the additional claims corresponding to the at least one additional claims providers.

In another embodiment of the foregoing computer-readable medium, the method further comprises: prior to receiving the request for access to the resource, establishing a trust relationships with at least the second claims provider; and storing for the second claims provider: an identifier for the second claims provider; an address for accessing the second claims provider; one or more controls that enable one or more claims to be requested from the second claims provider; and expected values for the one or more claims.

In another embodiment of the foregoing computer-readable medium, said enabling the user to access the resource in response to at least the received first and second claims comprises: first comparing the generated first claims to stored expected values for the first claims; second comparing the received second claims to the stored expected values for the second claims; and determining whether to enable the user to access the resource based on results of said first comparing and said second comparing.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A claims facilitator implemented in a computing device and configured to enable access to a resource, the claims facilitator comprising:
an authentication flow manager configured to:
receive, from an administration user interface, an authentication flow that comprises a selection and ordering of a first claims provider and a second claims provider by which authentication should be performed to access the resource;
receive, from a user, a request for access to the resource;
access the authentication flow for granting access to the resource;
obtain first claims for the user from the first claims provider in the authentication flow,
determine the second claims provider in the authentication flow, the second claims provider having a trust relationship with the claims facilitator,
direct the user to a uniform resource locator (URL) of the second claims provider to complete an authentication procedure requested by the second claims provider, and
receive second claims for the user from the second claims provider; and
a resource access controller configured to enable the user to access the resource in response to at least the first and second claims.

2. The claims facilitator of claim 1, wherein the first claims provider is implemented in the computing device and is configured to perform a procedure to generate the first claims.

3. The claims facilitator of claim 1, wherein, to obtain the first claims, the authentication flow manager is configured to:
determine the first claims provider in the authentication flow, the first claims provider external to the computing device and having a trust relationship with the claims facilitator;
direct the user to the first claims provider; and
receive the first claims from the first claims provider.

4. The claims facilitator of claim 1, wherein:
the authentication flow manager is further configured to:
determine at least one additional claims provider in the authentication flow, the at least one additional claims provider having a trust relationship with the claims facilitator;
direct the user to the at least one additional claims provider; and
receive from the at least one additional claims provider additional claims corresponding to the at least one additional claims provider; and
the resource access controller is further configured to:
enable the user to access the resource in response to the received first claims, the second claims, and the additional claims corresponding to the at least one additional claims provider.

5. The claims facilitator of claim 1, wherein the claims facilitator further comprises:
a trust relationship manager configured to:
prior to receiving the request for access to the resource, establish a trust relationship with at least the second claims provider; and
store for the second claims provider:
an identifier for the second claims provider;
an address for accessing the second claims provider;
one or more controls that enable one or more claims to be requested from the second claims provider; and
expected values for the one or more claims.

6. The claims facilitator of claim 5, wherein the resource access controller is configured to compare the first claims to stored expected values for the first claims, and to compare the received second claims to the stored expected values for the second claims, to determine whether to enable the user to access the resource.

7. The claims facilitator of claim 1, wherein the authentication flow manager is further configured to:
receive the authentication flow defined by an administrator.

8. A method performed by a computing device, comprising:
receiving, from an administration user interface, an authentication flow that comprises a selection and ordering of a first claims provider and a second claims provider by which authentication should be performed to access the resource;
receiving, from a user, a request for access to the resource;
accessing the authentication flow for granting access to the resource;
obtaining first claims for the user from the first claims provider in the authentication flow;
determining the second claims provider in the authentication flow, the second claims provider having a trust relationship with a claims facilitator;
directing the user to a uniform resource locator (URL) of the second claims provider;
receiving second claims for the user from the second claims provider to complete an authentication procedure requested by the second claims provider; and
enabling the user to access the resource in response to at least the received first and second claims.

9. The method of claim 8, wherein the first claims provider is implemented in the computing device, and said obtaining first claims for the user from the first claims provider in the authentication flow comprises:
performing a procedure in the first claims provider to generate the first claims.

10. The method of claim 8, wherein said obtaining first claims for the user from the first claims provider in the authentication flow comprises:
determining the first claims provider in the authentication flow, the first claims provider external to the computing device and having a trust relationship with the claims facilitator;
directing the user to the first claims provider; and
receiving the first claims from the first claims provider.

11. The method of claim 8, further comprising:
determining at least one additional claims provider in the authentication flow, the at least one additional claims provider having a respective trust relationship with the claims facilitator;
directing the user to the at least one additional claims provider; and
receiving from the at least one additional claims provider additional claims corresponding to the at least one additional claims provider; and
wherein said enabling the user to access the resource in response to at least the received first and second claims comprises:

enabling the user to access the resource in response to the received first claims, the second claims, and the additional claims corresponding to the at least one additional claims provider.

12. The method of claim 8, further comprising:
prior to receiving the request for access to the resource, establishing a respective trust relationship with at least the second claims provider; and
storing for the second claims provider:
an identifier for the second claims provider;
an address for accessing the second claims provider;
one or more controls that enable one or more claims to be requested from the second claims provider; and
expected values for the one or more claims.

13. The method of claim 12, wherein said enabling the user to access the resource in response to at least the received first and second claims comprises:
first comparing the first claims to stored expected values for the first claims;
second comparing the received second claims to the stored expected values for the second claims; and
determining whether to enable the user to access the resource based on results of said first comparing and said second comparing.

14. The method of claim 8, further comprising:
enabling an administrator to define the authentication flow.

15. A computer-readable medium having computer program logic recorded thereon that when executed by at least one processor causes the at least one processor to perform a method, the method comprising:
receiving, from an administration user interface, an authentication flow that comprises a selection and ordering of a first claims provider and a second claims provider by which authentication should be performed to access the resource;
receiving, from a user, a request for access to the resource;
accessing the authentication flow for granting access to the resource;
obtaining first claims for the user from the first claims provider in the authentication flow;
determining the second claims provider in the authentication flow, the second claims provider having a trust relationship with a claims facilitator;
directing the user to a uniform resource locator (URL) of the second claims provider to complete an authentication procedure requested by the second claims provider;
receiving second claims for the user from the second claims provider; and
enabling the user to access the resource in response to at least the received first and second claims.

16. The computer-readable medium of claim 15, wherein the first claims provider is implemented in the computing device, and said obtaining first claims for the user from the first claims provider in the authentication flow comprises:
performing a procedure in the first claims provider to generate the first claims.

17. The computer-readable medium of claim 16, wherein said obtaining first claims for the user from the first claims provider in the authentication flow comprises:
determining the first claims provider in the authentication flow, the first claims provider external to the computing device and having a respective trust relationship with the claims facilitator;
directing the user to the first claims provider; and
receiving the first claims from the first claims provider.

18. The computer-readable medium of claim 15, wherein the method further comprises:
determining at least one additional claims provider in the authentication flow, the at least one additional claims provider having a trust relationship with the claims facilitator;
directing the user to the at least one additional claims provider; and
receiving from the at least one additional claims provider additional claims corresponding to the at least one additional claims provider; and
wherein said enabling the user to access the resource in response to at least the received first and second claims comprises:
enabling the user to access the resource in response to the received first claims, the second claims, and the additional claims corresponding to the at least one additional claims provider.

19. The computer-readable medium of claim 15, wherein the method further comprises:
prior to receiving the request for access to the resource, establishing a respective trust relationship with at least the second claims provider; and
storing for the second claims provider:
an identifier for the second claims provider;
an address for accessing the second claims provider;
one or more controls that enable one or more claims to be requested from the second claims provider; and
expected values for the one or more claims.

20. The computer-readable medium of claim 19, said enabling the user to access the resource in response to at least the received first and second claims comprises:
first comparing the generated first claims to stored expected values for the first claims;
second comparing the received second claims to the stored expected values for the second claims; and
determining whether to enable the user to access the resource based on results of said first comparing and said second comparing.

* * * * *